(12) United States Patent
Guy et al.

(10) Patent No.: US 6,915,038 B2
(45) Date of Patent: Jul. 5, 2005

(54) OPTICAL CORNER COUPLER SYSTEM AND METHOD

(75) Inventors: James Kevan Guy, Mesa, AZ (US); Scott T. Yee, Chandler, AZ (US)

(73) Assignee: The Boeing Company, Chicago, IL (US)

(*) Notice: Subject to any disclaimer, the term of this patent is extended or adjusted under 35 U.S.C. 154(b) by 150 days.

(21) Appl. No.: 10/243,500

(22) Filed: Sep. 13, 2002

(65) Prior Publication Data

US 2004/0052455 A1 Mar. 18, 2004

(51) Int. Cl.$^7$ .................................................. G02B 6/26
(52) U.S. Cl. .......................... 385/31; 385/36; 385/16
(58) Field of Search .............................. 385/31, 9, 16, 385/19, 27, 33, 35, 36, 39

(56) References Cited

U.S. PATENT DOCUMENTS

| | | | |
|---|---|---|---|
| 3,708,431 A | 1/1973 | Prussin ..................... 252/188.3 |
| 4,122,159 A | 10/1978 | Madrange et al. ............ 424/45 |
| 4,422,714 A | * 12/1983 | Benoit et al. .................. 385/39 |
| 4,664,835 A | 5/1987 | Grollier et al. ............... 252/90 |
| 4,683,004 A | 7/1987 | Goddard ..................... 106/170 |
| 4,699,453 A | 10/1987 | Roberts | |
| 4,747,651 A | * 5/1988 | Wiesmeier .................... 385/46 |
| 4,814,600 A | * 3/1989 | Bergstrom ................... 250/221 |
| 4,993,796 A | * 2/1991 | Kapany et al. ............... 398/82 |
| 5,002,680 A | 3/1991 | Schmidt et al. ............... 252/90 |
| 5,009,880 A | 4/1991 | Grollier et al. ............... 424/47 |
| 5,047,166 A | 9/1991 | Weil .......................... 252/132 |
| 5,291,331 A | * 3/1994 | Miano et al. ................ 359/598 |
| 5,402,327 A | * 3/1995 | Gordin et al. ............... 362/298 |
| 5,421,589 A | * 6/1995 | Monroe ......................... 345/9 |
| 5,443,817 A | 8/1995 | Zimmerman et al. ......... 424/47 |
| 5,455,035 A | 10/1995 | Guerrero et al. ............ 424/401 |
| 5,602,091 A | 2/1997 | Monson et al. ............. 510/406 |
| 5,653,970 A | 8/1997 | Vermeer ................... 424/70.24 |
| 5,661,189 A | 8/1997 | Grieveson et al. .......... 514/784 |
| 5,804,546 A | 9/1998 | Hall .......................... 510/406 |

(Continued)

OTHER PUBLICATIONS

Web page from www.personalcare.noveoninc.com, "Products" (2 pages).
Web page from www.cosmetic-information.com, "Cosmetic-Information.com" (3 pages).
Web page from www.atalink.co.uk, "Opportunities for L(+)lactic Acid in the Cosmetics Industry" (5 pages).
Web page from www.chemcentral.com, "What's New" (1 page).
Web page from www.carltoncosmetics.de, "Carlton Botanical Ingredients" (1 page).
Web page from www.colorcom.com, "Colorcon" (2 pages).
Web page from www.herc.com, "Natrosol" (3 pages).

Primary Examiner—K. Cyrus Kianni
(74) Attorney, Agent, or Firm—Harness Dickey & Pierce P.L.C.

(57) ABSTRACT

An optical coupling system and method for transmitting optical signals around sharp bends or curves without the use of prisms, mirrors or other conventional reflecting elements. The coupling system includes a reflecting element having a curved outer reflecting surface shaped in accordance with an ellipsoid. First and second optical elements are arranged along the two focal planes of the ellipsoid in a manner to achieve Total Internal Reflection (TIR) of the optical signal transmitted from the first optical element to the second optical element. An alternative embodiment discloses a coupling system for coupling a signal from a single input optical element into a pair of output optical elements. The use of TIR achieves extremely high efficiency in the transmission of an optical signal around a curve or bend between two optical elements.

12 Claims, 2 Drawing Sheets

U.S. PATENT DOCUMENTS

| | | | |
|---|---|---|---|
| 5,858,343 A | 1/1999 | Szymczak | 424/73 |
| 5,874,093 A | 2/1999 | Eliaz et al. | 424/401 |
| 5,888,478 A | 3/1999 | Maurin | 424/45 |
| 5,902,225 A | 5/1999 | Monson | 516/10 |
| 5,976,520 A | 11/1999 | Babinski et al. | 424/73 |
| 6,177,092 B1 | 1/2001 | Lentini et al. | 424/401 |
| 6,228,378 B1 | 5/2001 | Takanabe et al. | 424/401 |
| 6,496,636 B1 * | 12/2002 | Braiman et al. | 385/129 |
| 6,550,938 B2 * | 4/2003 | Barnes et al. | 362/311 |
| 6,704,479 B2 * | 3/2004 | Koplow | 385/31 |
| 2002/0002123 A1 | 1/2002 | McGee et al. | 510/140 |
| 2002/0028182 A1 | 3/2002 | Dawson et al. | 424/45 |
| 2002/0051303 A1 * | 5/2002 | Smaglinski | 359/728 |
| 2003/0026775 A1 | 2/2003 | Marchesi et al. | 424/73 |
| 2003/0053980 A1 | 3/2003 | Dodd et al. | 424/73 |

* cited by examiner

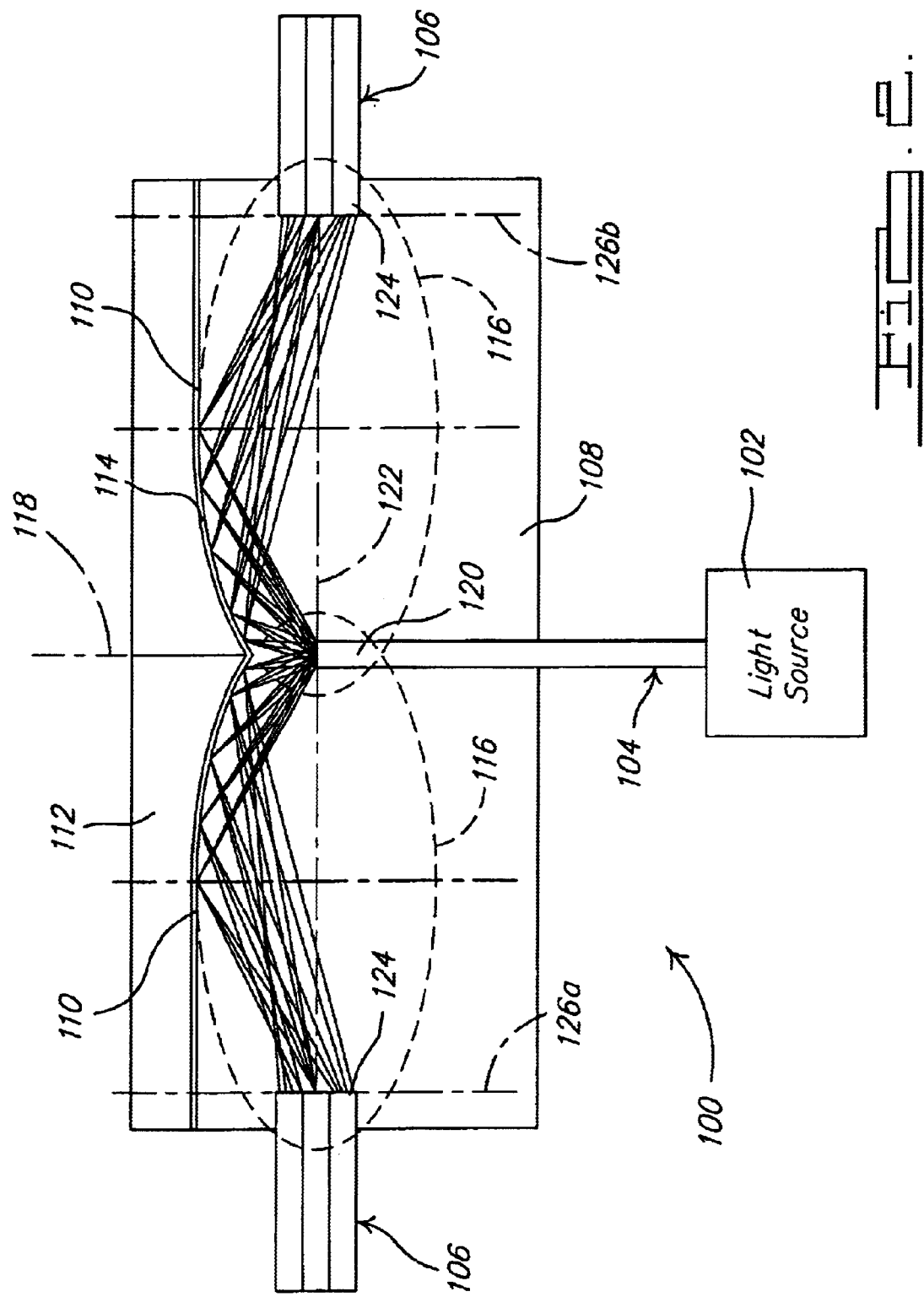

OPTICAL CORNER COUPLER SYSTEM AND METHOD

FIELD OF THE INVENTION

The present invention relates to optical coupling systems, and more particularly to a coupling apparatus adapted to couple light transmitted from one optical element to another optical element around a sharp bend or corner exceeding the bend radius of the optical element being used.

BACKGROUND OF THE INVENTION

When designing a fiber optic illumination system, the system designer is inevitably faced with situations where the optical fiber has to make a sharp bend around a corner. This is particularly common in aircraft and aerospace applications where an optical fiber must be routed around bulkheads, door jams, etc. This problem often cannot be solved by using just the bend radius of the optical fiber or optical fiber bundle. One solution, however, is to use a prism or mirror to reflect light exiting from one optical fiber into a separate optical fiber, to thereby channel the light around a corner or sharp bend. However, prisms and mirrors suffer from inherent inefficiencies due to beam expansion through the prism or mirror. Furthermore, with regard to the mirror, this component will produce a reflectivity loss due to the optical coating that is typically employed thereon.

Total Internal Reflection (TIR) is a well known phenomenon that is the most efficient way to preserve the most light directed toward a target surface. It has been found that an ellipsoidal, solid, transparent image will TIR any light from one focus of the ellipsoidal shape to the other focus, where the light reflects off the curved surface of the ellipsoid between its two focal planes. The ability to use TIR in reflecting light between a first optical cable and a second optical cable would be highly desirable because TIR is an extremely efficient light reflection mechanism. TIR is known to be capable of reflecting about 99.9% of the light signal from a source (i.e., bulb, fiber feed light guide, etc.) at one focus to an accepting output device (i.e., optical fiber bundle, light guide, etc.) at the other focus.

Accordingly, it would be highly desirable to provide an optical coupling device that incorporates TIR for channeling light around a corner or bend between two optical fibers.

It would also be desirable to provide such a coupling device as described immediately above that does not include a large number of independent component parts, that is relatively light in weight and compact, and which is therefore ideally suited for aircraft and aerospace applications.

SUMMARY OF THE INVENTION

The above and other objects are provided by an optical coupler apparatus and method in accordance with preferred embodiments of the present invention. In one preferred embodiment the optical coupler apparatus comprises a solid, optically transparent material which is in optical communication with an input optical element and an output optical element. The solid, optically transparent material forms a reflecting component or medium having a curved outer surface. The curved outer surface is further formed in accordance with the curvature of an ellipsoid. An output end of the input optical element is disposed adjacent a first focal plane of the ellipsoid while an input end of the output optical element is disposed adjacent a second focal plane of the ellipsoid. The input optical element and the output optical element are further arranged such that the light signal emanating from the output end of the input optical element is reflected by the curved outer surface of the reflecting element into the input end of the output optical element using the principal of Total Internal Reflection (TIR). Through the use of TIR, almost 100% of the light emanating from the output end of the input optical element is reflected into the input end of the output optical element.

In the preferred embodiment described above, a support element may be secured adjacent to the reflecting element in a manner which provides an air gap between the curved outer surface of the reflecting element and a portion of the support element facing the curved outer surface. Both the input optical element and the output optical element are further arranged relative to the focal planes of the ellipsoid in accordance with the numerical aperture (NA) of the light emanating from the input optical element with minimal dispersion and following Etendue.

In an alternative preferred embodiment, the present invention provides a 180° TIR optical coupler for coupling an optical signal emanating from an input optical element simultaneously into, but not limited to, a pair of output optical elements. This is accomplished by the use of a solid transparent material forming a reflecting element having a pair of curved outer surfaces, where each of the curved outer surfaces are formed in accordance with the curvature of an ellipsoid. The input optical element is arranged adjacent a focal plane of each of the ellipsoids, where the curved outer surfaces are further formed such that a first focal plane of each ellipsoid overlaps one another. The output optical elements are arranged adjacent each of the second focal planes of the two ellipsoids. TIR is employed to achieve nearly 100% efficiency in reflecting an optical signal emanating from an output end of the input optical element into the input ends of the two output optical elements with minimal dispersion and following Etendue.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 2 is a side view of an optical coupler in accordance with an alternative preferred embodiment of the present invention for coupling an optical signal from an output end of an input optical element into the input ends including, but not limited to, a pair of optical elements.

DETAILED DESCRIPTION OF THE PREFERRED EMBODIMENTS

Figure 1:
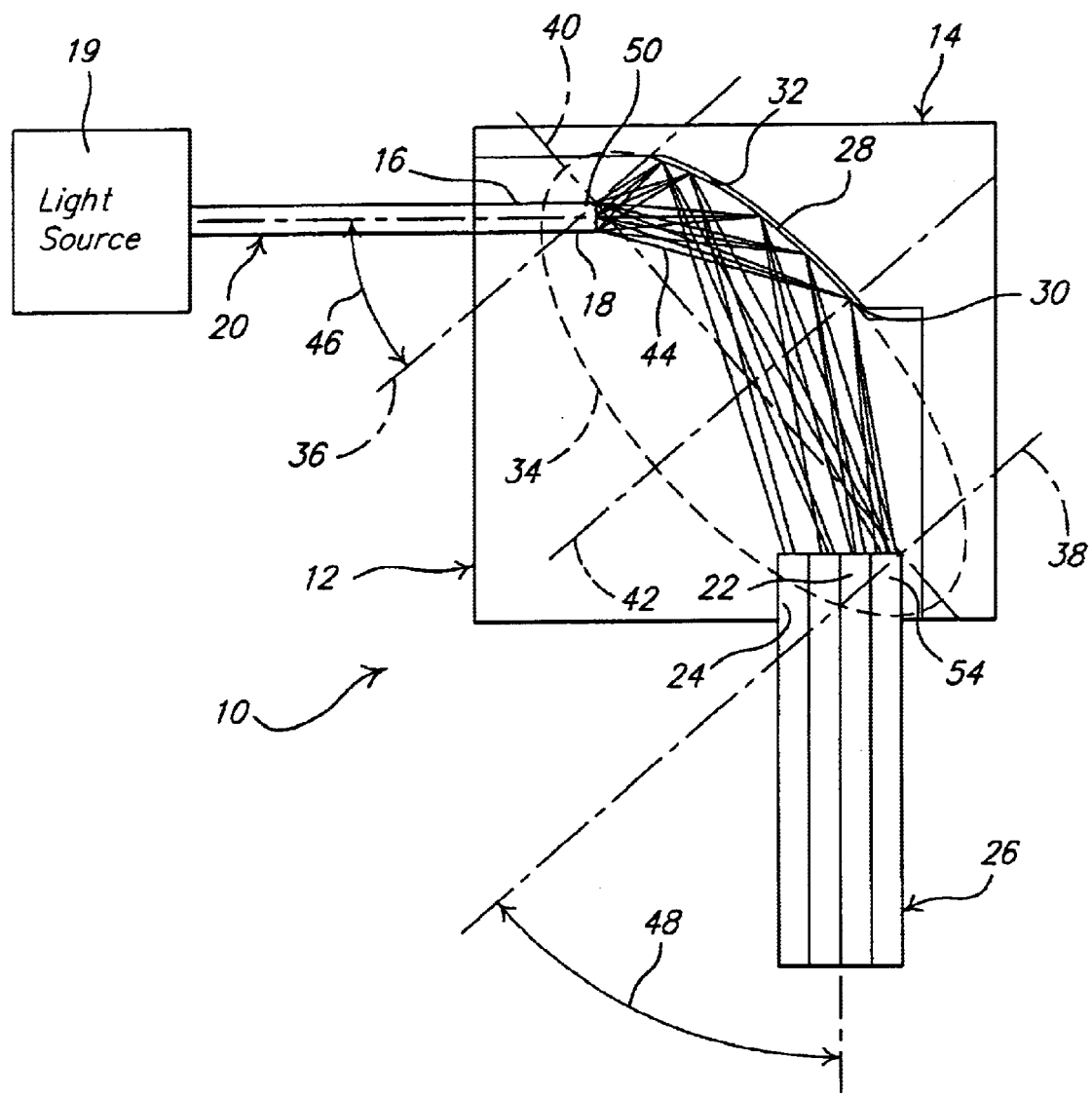
FIG. 1 is a simplified side view of an optical coupler system in accordance with a preferred embodiment of the present invention.

The following description of the preferred embodiment(s) is merely exemplary in nature and is in no way intended to limit the invention, its application, or uses.

Referring to FIG. 1, there is shown an optical coupler system 10 in accordance with a preferred embodiment of the present invention. The optical coupler system 10 forms a 90° optical coupler for coupling light between a pair of optical elements, for example optical fibers, that are arranged nonparallel to one another. The coupler system 10 includes a solid, transparent material 12 forming a reflecting element. The reflecting element 12 is positioned adjacent an optional support element 14. The reflecting element 12 includes a bore 16 for receiving an output end 18 of a first or input optical fiber 20. An optical source 19 provides a light signal into the first (i.e., input) optical fiber 20. A bore 24 receives an input end 22 of an output optical fiber bundle 26. It will be appreciated, however, that second optical fiber bundle 26 could just as readily comprise a single optical fiber. It will also be appreciated that while the following description will reference fiber optic elements as the input and output optical elements, that the coupler apparatus 10 could just as readily be constructed with any other light guiding/transmitting components, such as reflectors, micromirrors, etc.

With further reference to FIG. 1, the reflecting element 12 has a curved outer reflecting surface 28. An air gap 30 is formed between the curved outer reflecting surface 28 and a surface 32 of the support element 14, if the support element 14 is included for use. If support element 14 is not included, it is important that the curved outer reflecting surface 28 remain free from contact with other components or surfaces and free from dirt or other contaminants.

The curved outer reflecting surface 28 is further formed in accordance with an ellipsoid 34 indicated in dashed lines in FIG. 1. Ellipsoid 34 has a first focal plane 36 and a second focal plane 38, as well as a major axis 40 and minor axis 42. The output end 18 of the first optical fiber 20 is arranged adjacent the first focal plane 36, and in accordance with a numerial aperture (NA) of the optical signal emanating therefrom, such that the optical signal leaving the output end 18 is contained within the focal plane 36 (i.e., under the focal plane 18 in the drawing of FIG. 1). Similarly, the input end 22 of the optical fiber bundle 26 is arranged adjacent the second focal plane 38 such that light is able to be reflected from the curved outer reflecting surface 28 into the optical bundle 26.

The reflecting element 12 preferably comprises a glass, acrylic, polycarbonate, or any other optically transparent material. The reflecting element 12 makes use of the principal of Total Internal Reflection (TIR). TIR is a well known phenomenon which enables an estimated 99.9% of the optical signal emanating from the output end 18 of first optical fiber 20 to be reflected off of the curved outer reflecting surface 28 back into the input end 22 of the optical fiber bundle 26. To achieve TIR of the optical signal, designated by reference numeral 44, the first optical fiber 20 has to be arranged in consideration of the numerical aperture (NA) of the optical signal emanating from its output end 18. For example, if the optical signal emanating from output end 18 comprises a cone having an angle of divergence of about 30°, then the first optical fiber 20 would be arranged at an angle of 15° relative to the first focal plane 36. This angle is denoted by reference numeral 46 in FIG. 1. Similarly, the output optical fiber bundle 26 is required to be arranged closely adjacent the focal plane 38 such that it extends at an angle represented by reference numeral 48, which is the same in magnitude as the angle 46. It will be noted also that a corner 50 of the output end 18 of the first optical fiber 20 is positioned at the intersection between the first focal plane 36 and the major axis 40. This ensures that the entire quantity of optical signal leaving the output end 18 is directed within the boundary of the focal plane 36. Similarly, corner 54 of the optical fiber bundle 26 is positioned at the intersection of the second focal plane 38 and the major axis 40 to ensure that the entire quantity of signal reflected by TIR is received at the input end 22 of the optical fiber bundle 26.

It will be appreciated that if the support element 14 is not used, it will be imperative that the outer curved reflecting surface 28 remains free from contact with other objects, dirt or any other substance that would interfere with its light reflecting capacity. Support element 14 can thus not only assist in supporting the reflecting element 12, but can also form a means for effectively sealing the curved outer reflecting surface 28 from such contaminants that could affect the reflection of light therefrom.

It will also be appreciated that the precise curvature of the curved outer reflecting surface 28 will depend in large part on the spacing separating the ends 18 and 22 of the optical fiber 20 and optical fiber bundle 26, respectively. The greater the spacing, the lesser the degree of curvature of outer curved reflecting surface 28 that will be required. Conversely, the closer the outer ends 18, 22 are positioned to each other, the greater the degree of curvature that will be required.

Referring to FIG. 2, an optical coupler 100 in accordance with an alternative preferred embodiment of the present invention is shown. The optical coupler 100 is similar to the optical coupler 10 with the exception that coupler 100 is capable of coupling an input optical signal generated by an optical signal source 102 from an input optical fiber 104 to a pair of output optical fiber bundles 106. It will be appreciated immediately, however, that while a coupling into two optical elements is illustrated, this embodiment is not limited to coupling arrangements involving only two optical elements. Accordingly, a single optical element could be coupled into three or more optical elements with minor modifications to the embodiment shown in FIG. 2.

In FIG. 2, the coupling is accomplished by a solid transparent material (e.g., glass, acrylic, etc.) forming a reflecting element 108 having a symmetrical pair of curved outer reflecting surfaces 110. An optical support element 112 helps to form an air gap 114 between the curved outer reflecting surfaces 110 and the support element 112 and to support the reflecting element 108. Again, it will be appreciated that the coupler 100 could be employed with any form of light transmitting elements and is not limited to use with just fiber optics.

In the embodiment of FIG. 2, each of the curved outer reflecting surfaces 110 is formed in accordance with an ellipsoid 116. The ellipsoids 116 are further formed such that a first focal plane of each overlaps to form a common, first focal plane 118. An output end 120 of the input optical fiber 104 is arranged along the common focal plane 118. Approximately 50% of the optical signal emanating from the output end 120 is reflected by TIR off of each outer curved reflecting surface 110 towards a respective one of the output optical fiber bundles 106. The output optical fiber bundles 106 are arranged longitudinally along a common, major axis 122 of the ellipsoids 116, and an outermost end 124 of each optical fiber bundle 106 is arranged at, and parallel to, an associated second focal plane 126a or 126b.

It will therefore be appreciated that the various preferred embodiments allow the phenomenon of TIR to be employed to achieve extremely high efficiency in reflecting optical signals around sharp bends or curves, and without the use of prisms, mirrors or other conventional reflecting components. The present invention further forms a coupling system which is relatively compact, light in weight, and is ideally suited to aircraft and aerospace applications where weight and space are critically important considerations for all components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An optical system for directing light traveling through a first optical element into a second optical element positioned non-parallel to the first optical element, said system comprising:

a reflecting element having a first bore for receiving an output end of said first optical element and adapted to receive light exiting from said output end of said first optical element, and for reflecting said light into an input end of said second optical element, the second optical element having said input end disposed in a second bore in said reflecting element;

said reflecting element including an optically transparent portion having a curved outer surface, said curved outer surface having a curvature in accordance with a portion of an ellipsoid;

said output end of said first optical element and said input end of said second optical element being arranged relative to a pair of focal planes of said ellipsoid such that Total Internal Reflection (TIR) of said light is produced by said curved outer surface, to thereby channel said light from said output end of said first optical element into said input end of said second optical element; and a support element disposed over said curved outer surface for supporting said reflecting element in a manner to create a sealed air gap between said curved outer surface and said support element.

2. The system of claim 1, wherein said air gap forms a sealed air packet to prevent the collection of contaminants on said curved outer surface.

3. The system of claim 1, wherein said reflecting element comprises an optically transparent acrylic material.

4. The system of claim 1, wherein said reflecting element comprises an optically transparent polycarbonate.

5. The system of claim 1, wherein said reflecting element comprises glass.

6. The system of claim 1, wherein said first optical element is arranged along an axis defining a first one of said focal planes of said ellipsoid such that light emanating therefrom is projected entirely on a side of said first focal plane closest to said second optical element.

7. The system of claim 1, wherein said second optical element is arranged along an axis defining a second one of said focal planes of said ellipsoid such that light emanating therefrom is projected entirely on a side of said second plane closest to said first optical element.

8. The system of claim 1, wherein each of said first and second optical elements are arranged relative to said focal planes in accordance with a numerical aperture (NA) of said light being transmitted through said first optical element.

9. An optical system for directing light traveling through a first optical element into a second optical element positioned non-parallel to the first optical element, said system comprising:

a reflecting element having a first bore for receiving an input end of said first optical element and adapted to receive light exiting from output end of said first optical element, and for reflecting said light into an input end of said second optical element, wherein said input end of said second optical element is disposed in a second bore in said reflecting element;

a supporting element for supporting said reflecting element;

said reflecting element including an optically transparent portion having a outer curved surface, said outer surface having a curvature in accordance with a portion of an ellipsoid;

a sealed air gap formed between said outer curved surface and a portion of said supporting element facing said outer curved surface;

said output end of said first optical element and said input end of said second optical element being arranged relative to a pair of focal planes of said ellipsoid, and with respect to a numerical aperture of said light, such that a maximum guantity of said light leaving said output end of said first optical element is reflected by Total Internal Reflection (TIR) from said outer curved surface, to thereby channel said light from said output end of said first optical element into said input end of said second optical element.

10. The system of claim 9, wherein said reflecting element is comprised of optically transparent acrylic.

11. The system of claim 9, wherein said reflecting element is comprised of optically transparent polycarbonate material.

12. The system of claim 9, wherein said reflecting element is comprised of glass.

* * * * *